V. H. EMERSON AND R. B. WHEELAN.
MEANS FOR INDICATING MATTER PRODUCED ON SOUND RECORDS.
APPLICATION FILED JAN. 24, 1920.
1,404,194.
Patented Jan. 24, 1922.
2 SHEETS—SHEET 2.
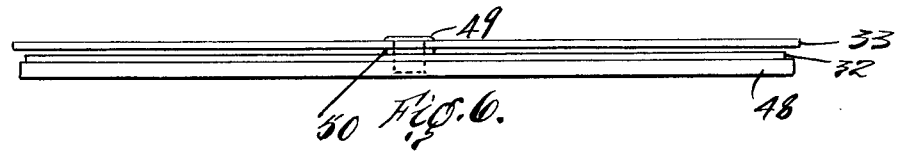
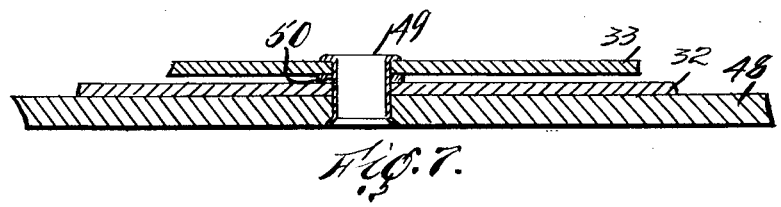
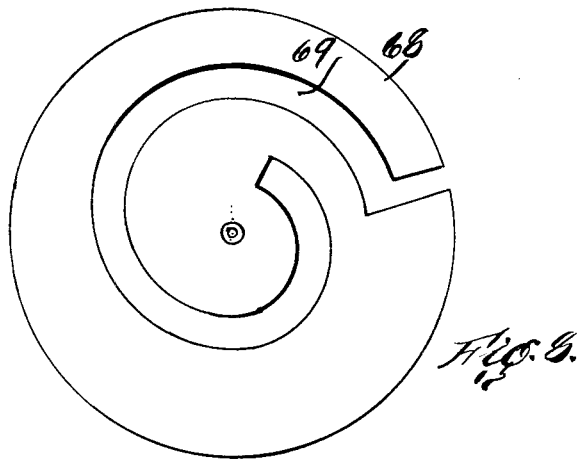
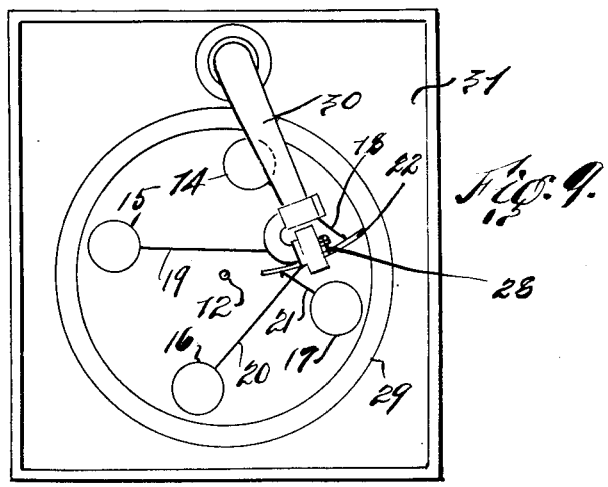
Inventors
Victor H. Emerson
Robert B. Wheelan
By their Attorney

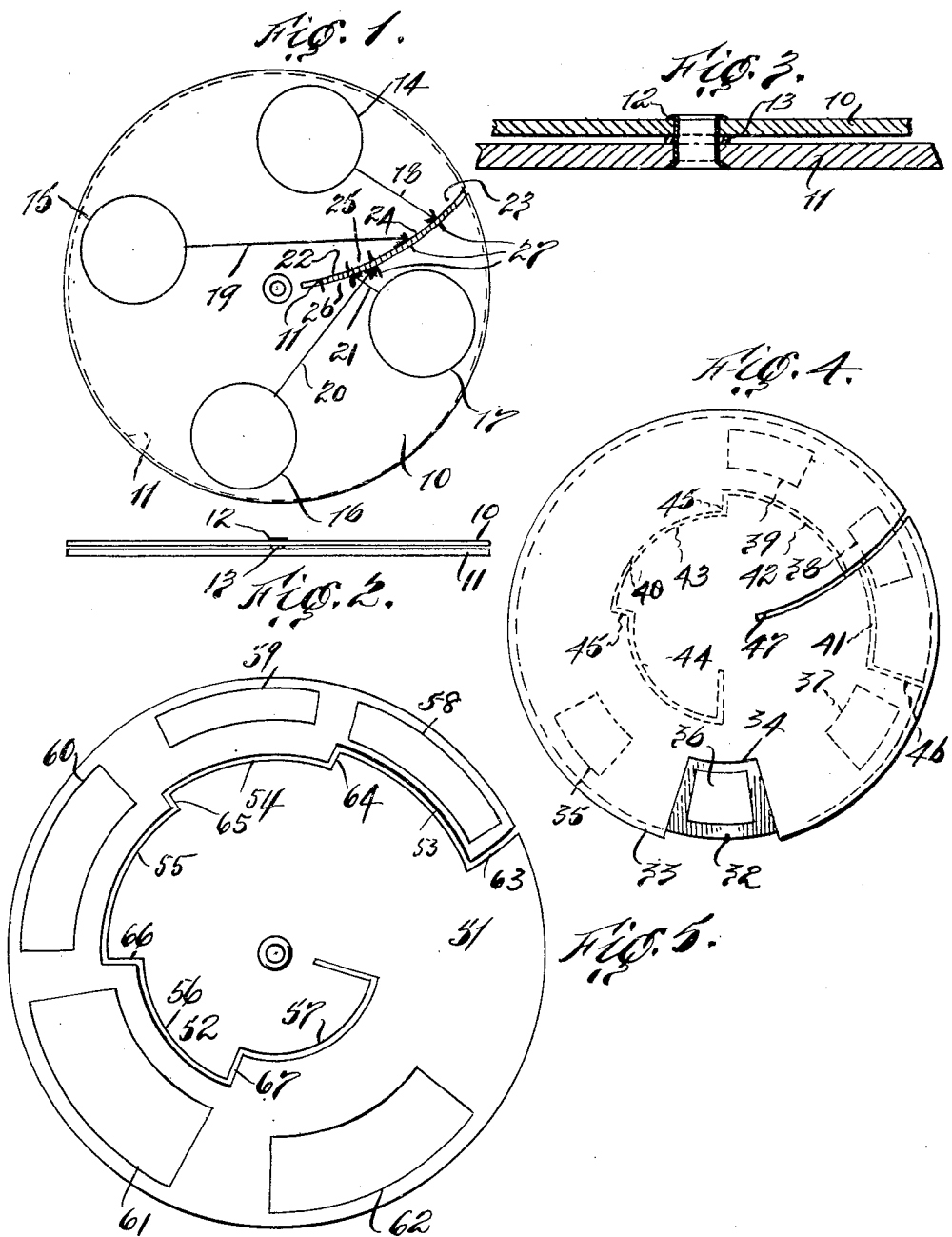

UNITED STATES PATENT OFFICE.

VICTOR H. EMERSON AND ROBERT B. WHEELAN, OF NEW YORK, N. Y.; SAID EMERSON ASSIGNOR TO EMERSON PHONOGRAPH CO., INC., OF NEW YORK, N. Y., A CORPORATION OF NEW YORK.

MEANS FOR INDICATING MATTER PRODUCED ON SOUND RECORDS.

1,404,194.  Specification of Letters Patent.  Patented Jan. 24, 1922.

Application filed January 24, 1920. Serial No. 353,657.

*To all whom it may concern:*

Be it known that we, VICTOR H. EMERSON and ROBERT B. WHEELAN, citizens of the United States of America, residing at New York city, county and State of New York, have invented certain new and useful Improvements in Means for Indicating Matter Produced on Sound Records, of which the following is a full, clear, and exact description.

This invention relates to improvements in indicators to be used in combination with sound-records of musical compositions, monologues, etc. One of the objects of our invention is to provide visible means, in combination with a sound-record disk, to indicate, by illustration or words, a certain portion or portions of the records which are being reproduced. In other words by means of our improved indicator a song, musical composition, etc., can be illustrated as the reproduction progresses. For example, take a record of the nursery song, "Mary had a little lamb," by means of our improvement the words "Mary had a little lamb," as they are reproduced would have associated therewith the picture of a little girl and a lamb. The next line, "Its fleece was white as snow," would have associated therewith (for instance), a snow scene. The next line "And everywhere that Mary went the lamb was sure to go," would have associated therewith a picture of a little girl followed by a lamb; and so on.

To carry out our invention, we superimpose upon a record-disk a second disk, which is preferably loosely secured to the record-disk. During the rotation of the record disk the superimposed disk will be held against rotation, the record disk revolving underneath the superimposed or indicator disk. The superimposed disk is provided with a slot for the passage therethrough of the reproducing needle in order that the needle can contact with the record-disk.

Our invention can be carried out in various ways without departing from its general principles, and we will now describe a few ways of obtaining the result sought, reference being had to the accompanying drawings, wherein:—

Fig. 1 is a top plan view of a record-disk and a superimposed indicator disk, illustrating one embodiment of our invention;

Fig. 2 is an edge view thereof;

Fig. 3 is an enlarged sectional view illustrating one way to secure the disks together;

Figs. 4 and 5 illustrate modified forms of our invention;

Fig. 6 is an enlarged edge view of the device as illustrated in Fig. 4;

Fig. 7 is an enlarged sectional view thereof;

Fig. 8 is a plan view of still another form of our invention; and

Fig. 9 is a diagrammatic view of a phonographic device having our improvement applied thereto.

To carry our invention into practice, we provide an indicator disk having illustrations or other matter thereon, disposed in such positions as may be desirable. The illustrations, etc., will correspond to certain portions of the record to which the indicator disk is attached to illustrate or indicate said portions. For instance, as indicated in Figs. 1, 2 and 3, an indicator disk 10 is superimposed upon a record disk 11 and is loosely secured thereto by (in this instance) an eyelet 12. If desirable a separator or washer 13 may be employed to keep the disks apart. In this form, the disk indicator 10 will contain illustrations indicated by 14, 15, 16 and 17 from which arrows 18, 19, 20 and 21, respectively, are directed toward a slot 22 in said disk 10. The edge of slot 22 will be divided into sections 23, 24, 25 and 26 by index lines 27. That portion of the record between the peripheral edge thereof and first lines 27, or within region 23, will contain words or music relating to illustration 14, and so on. While record disk 11 is rotating, indicator disk 10 will be held stationary by the reproducer needle indicated by 28 in Fig. 9, and the needle will travel in slot 22 toward the center of the record. In Fig. 9 a record plate is indicated by 29 and a tone arm by 30, said arm and plate being carried by a suitable cabinet 31.

While we have not indicated any particular illustrations, it is obvious that such can be placed at the positions indicated by 14, 15, 16 and 17, or in other desirable positions. It is also quite obvious that illustrations placed as described in combination with the arrows, and sections adjacent the needle-slot 22, will indicate, as the reproducer needle progresses, the portions of the record within said sections. Any desired song, poem, or monologue, etc., may be illustrated or indicated in this manner.

Instead of employing a single indicating disk, we may employ an indicating disk such as is referred to by 32 in Figs. 4, 6 and 7, and a covering disk 33 having an opening 34 through which the illustrations, indicated by 35, 36, 37, 38 and 39, may be seen as they register therewith. In this form of our invention the indicating disk 32 will be provided with an eccentrically disposed irregular slot 40, made up of concentric portions 41, 42, 43, 44, connected by radial slots or channels 45, one of said concentric portions, 41, being connected with the periphery of the disk by a channel 46. The covering disk 33 will also be provided with a slot 47 for the reproducer-needle to pass through to contact with the sound record 48 to which the disks 32 and 33 are loosely connected by an eyelet 49. The disks 32 and 33 may be maintained apart by a separator or washer 50, while the under disk 33 will lie upon the record disks 48. In this form of our invention, the needle will hold the covering disk 33 against rotation and also the indicating disk 32, so long as said needle engages any of the channels 45 or channel 46. While the needle is in engagement with the slot 47 and channel 46, the picture or words corresponding therewith will register with opening 34. While the needle is in engagement with a channel, it will travel toward the center of the record longitudinally of said channel and also of slot 47 which will be in register therewith. As soon as the needle registers with a concentric portion of the irregular slot, the indicating-disk will rotate with the record, causing another illustration or words to register with the opening 34. The illustration or words caused to register with opening 34 will correspond to that portion of the record spanned by the channel 45 which is engaged by the needle. To repeat, disk 32 will be held against rotation, while the needle is in engagement with a channel 45 or channel 46, but will rotate when the needle registers with a concentric portion 41, 42, 43 or 44 of the irregular slot. Illustration 35 (for instance) will correspond with channel 46; 36 with first channel 45, from channel 46; 37, with second channel, and so on. The disk 32 will be rotated, owing to the fact that it lies against the record-disk.

If desirable, the covering disk can be omitted and a disk such as 51, Fig. 5, having an irregular slot 52 made up of concentric portions 53, 54, 55, 56 and 57, can be used. In this instance, the illustrations, 58, 59, 60, 61 and 62, will correspond with that portion of a record spanned by the channels 63, 64, 65, 66 and 67. Instead of employing a disk having an irregular slot, we may employ a disk 68, Fig. 8, having an eccentric slot 69 which will revolve slowly, much slower than the record which carries same, said disk having illustrations, etc., thereupon.

It is quite obvious that as many illustrations or the like may be used as deemed desirable and also that said illustrations may be disposed in any desired position upon the indicating disk. The superimposed indicator disk also acts to protect the record, and besides keeps it free of dust, grit, etc.

In the form of our invention illustrated in Fig. 1, disk 10 will not be movable during the rotation of the record disk. In the form illustrated in Figs. 4 and 5, the disk having the irregular slot will be intermittently movable during the rotation of the record disk. The eccentric slot 69 in the form of our invention, illustrated in Fig. 8, will not permit disk 68 to rotate as rapidly as the record disk, as the needle will contact with the outer wall of said slot and cause the disk 68 to drag. As the disk slowly rotates, the illustrations thereon will change their position relative to the needle.

Having now described our invention, what we claim and desire to secure by Letters Patent is:

1. In combination with a record disk, an indicating disk loosely connected thereto and having a slot for the travel of a reproducer needle therealong, said indicating disk adjacent the slot being divided into sections associated with illustrative means, whereby as the record revolves and as the needle travels along said slot, that portion of the record included within the limits of the section along which the needle is traveling, will be indicated by the illustration associated with that particular section.

2. In combination with a record disk, an indicating disk in frictional contact therewith having an irregular eccentric slot therein for the passage of a needle and consisting of portions concentric with the axis of the disk but out of alinement one with the other, and having radial channels connecting the concentric portions of the slot at the end thereof, each connecting channel having illustrative means associated therewith, the illustrations associated with said channels representing that portion of the record traversed by the needle during its course along said channels.

3. In combination with a record disk, an indicating disk in frictional contact therewith having an irregular eccentric slot therein for the passage of a needle and consisting of portions concentric with the axis of the disk but out of alinement one with the other, and having radial channels connecting the concentric portions of the slot at the end thereof, a covering disk for the indicating disk having a slot for the passage of a reproducer needle, said slot being disposed transversely of the irregular slot, and an illustration carried by the indicating disk for each connecting channel, said covering disk being further provided with an opening to register with said illustrations, the illustrations associated with said channels representing that portion of the record traversed by the needle during its course along said channels.

4. In combination with a record disk, an intermittently rotatable indicating disk in frictional contact therewith and having an irregular eccentric slot therein for the passage therethrough of a needle in contact with a record, said indicating disk being provided with illustrations disposed relative to the irregularity of said slot so as to move, one at a time, to be at predetermined positions while that portion of the record represented by an illustration is being reproduced.

5. In combination with a record disk, an indicating disk in frictional contact therewith and having an irregular slot for the passage of a reproducer needle, consisting of portions concentric with the axis of the disk but out of alinement one with the other and having radial channels connecting the concentric portions of the slots at the ends thereof, each connected channel having illustrations associated therewith, all arranged so that the disk will remain stationary while a needle is traversing the said channels and partly rotate when said needle comes into line with the concentric slots, the illustrations associated with said channels representing that portion of the record traversed by the needle during its course along said channels.

6. In combination with a record disk, a rotatable indicating disk in frictional contact therewith, said indicating disk having illustrations corresponding with various portions of the record, arranged to move one by one to predetermined positions, said indicating disk being arranged for the passage of a needle to contact with the record disk, and means to enable the needle to hold the indicating disk stationary only while a portion of the record corresponding to the illustration is being played.

7. In combination with a record disk, an intermittently rotatable indicating disk carried thereby, said indicating disk being arranged for the passage therethrough of a needle to contact with said record-disk, illustrations carried by said indicating disk, said indicating disk being arranged to be held against rotation by the needle during certain intervals and to partly rotate at certain other intervals, all arranged so that an observer can at any time visually identify on the indicating disk that portion of the record being played as the record disk revolves.

8. In combination with a record disk, and a reproducing device, illustrative means associated with the disk and movable in unison therewith at certain intervals, the movement of the illustrative means being controlled by the reproducing device to cause the illustrations to move to a predetermined position during the reproduction of that prtion of the record represented by an illustration.

9. In combination with a record disk and reproducing device, including a needle, a carrier rotatably connected to the disk, illustrative means carried by the carrier, and means associated with the carrier arranged to cooperate with the reproducing device to permit of the partial rotation of the said carrier at certain predetermined intervals, to cause the illustrative matter on the carrier to change position relative to the reproducing needle, all arranged so that an observer can at any time visually identify on the indicating disk that portion of the record being played as the record disk revolves.

10. In combination with a record disk, a disk superimposed thereupon and rotatably connected therewith and having an irregular eccentrically disposed slot for the passage of a reproducer needle and spanning the record portion of the record disk, and a plurality of illustrative means located upon said disk and disposed adjacent different portions of said slot so as to move one at a time to be at a predetermined position at the time that said needle is traversing that portion of the record represented by an illustration.

11. A device of the character described, comprising a record disk, and an indicating disk superimposed thereon and pivotally connected thereto, the indicating disk being provided with a slot for the passage of a reproducing needle, and illustrative means on the indicating disk and associated with the slot to visually indicate to an observer that portion of the record being played.

12. A rotary record, a plurality of illustrations, a stylus movable upon the rotation of said record, a member adapted to gravitate into frictional engagement with said record and provided with a path for said stylus, said path cooperating with the stylus to selectively direct attention to said illustrations.

Signed at New York city, N. Y., this 23 day of January, 1920.

VICTOR H. EMERSON.
ROBERT B. WHEELAN.

Witnesses:
L. H. LEEMING,
MAURICE BLOCK.